(12) United States Patent
Papiernik (10) Patent No.: US 6,341,244 B1
(45) Date of Patent: Jan. 22, 2002

(54) METHOD AND CONTROL STRUCTURE FOR CONTROLLING MOMENTS IN NUMERICALLY CONTROLLED ELASTIC (AND THEREFORE OSCILLATION-CAPABLE) MULTIPLE MASS SYSTEMS

(75) Inventor: Wolfgang Papiernik, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/284,146

(22) PCT Filed: Oct. 8, 1996

(86) PCT No.: PCT/DE96/01925

§ 371 Date: Apr. 7, 1999

§ 102(e) Date: Apr. 7, 1999

(87) PCT Pub. No.: WO98/15880

PCT Pub. Date: Apr. 16, 1998

(51) Int. Cl.$^7$ ................................................. G06F 19/00
(52) U.S. Cl. ........................ 700/170; 700/159; 700/261; 700/44
(58) Field of Search ............................... 700/29, 44–45, 700/54, 159, 170, 260–261; 318/568.11

(56) References Cited

U.S. PATENT DOCUMENTS

| | | | |
|---|---|---|---|
| 4,734,847 A | | 3/1988 | Hunter |
| 4,925,312 A | * | 5/1990 | Onaga et al. ................ 700/261 |
| 5,144,211 A | * | 9/1992 | Daggett et al. ......... 318/568.11 |
| 5,761,444 A | * | 6/1998 | Ajanovic et al. ........... 710/100 |
| 6,025,679 A | * | 2/2000 | Harper et al. ................ 315/312 |
| 6,041,172 A | * | 3/2000 | Shah et al. ..................... 703/6 |

FOREIGN PATENT DOCUMENTS

| | | |
|---|---|---|
| EP | 0 289 151 | 11/1988 |
| EP | 0 406 784 | 1/1991 |
| EP | 0 446 362 | 9/1991 |
| EP | 0 604 672 | 7/1994 |
| WO | 92/15068 | 9/1992 |

\* cited by examiner

*Primary Examiner*—William Grant
*Assistant Examiner*—Ronald D Hartman, Jr.
(74) *Attorney, Agent, or Firm*—Staas & Halsey LLP (57) ABSTRACT

A control capability is provided for feed-forward torque control of numerically controlled, elastic and thus oscillating multiple-mass systems, which capability takes account of the elastic behavior between a drive and the load connected to it. This is achieved essentially in that a spring torque which causes oscillations and is associated with the most pronounced natural frequency of the multiple-mass system is derived from a reference model and is compensated for by applying disturbance compensation variables to a feed-forward torque control path.

8 Claims, 7 Drawing Sheets

METHOD AND CONTROL STRUCTURE FOR CONTROLLING MOMENTS IN NUMERICALLY CONTROLLED ELASTIC (AND THEREFORE OSCILLATION-CAPABLE) MULTIPLE MASS SYSTEMS

FIELD OF THE INVENTION

The present invention relates to a method and a control structure for torque feed-forward control of numerically controlled, elastic and thus oscillating multiple-mass systems such as machine tools, robots or the like.

BACKGROUND INFORMATION

Drive systems in which there is no rigid link between a motor and a load, for example the table of a machine tool, represent elastic and thus oscillating multiple-mass systems.

Conventionally, the methods for feed-forward control of the speed, acceleration and/or torque of such drive systems are based on the existence of a rigid link between the motor and the load. Such methods thus operate only subject to severe limitations in the case of elastic systems and have a high error component.

No suitable methods for feed-forward control of elastic systems have yet been described.

SUMMARY OF THE INVENTION

An object of the present invention is thus to provide a method as well as a control structure for torque feed-forward control of numerically controlled, elastic and thus oscillating multiple-mass systems, which take account of the elastic behavior between the motor and the load performed, e.g., using a processing device.

According to the present invention, this object is achieved by a method having the following method steps:

1.1 for reference-variable generation, parameters for impressing nominal motion states are estimated from an at least 4th-order reference model for motion control in that, derived from this in each axis control loop, 1.2 an axial nominal position angle is impressed via a nominal position value path in time with the interpolation, 1.3 an axial nominal rotation speed value is impressed via an advance rotation speed control path in time with the interpolation, and 1.4 an axial nominal drive torque value is impressed via an advance torque control path in time with the interpolation, in which case, 1.5 a spring toque which causes oscillations and is associated with the most pronounced natural frequency of the multiple-mass system is likewise derived from the reference model and compensated for by applying disturbance variables to the feed-forward torque control path.

A first advantageous embodiment of the method according to the present invention provides that the acceleration can be preset by additional degrees of freedom in time with the interpolation. This is made possible by the following further method step:

2.61 5th or higher order polynomials are used for fine interpolation in the reference model.

A further advantageous embodiment of the method according to the present invention provides that only the derivative of the jerk has discontinuities in the profile. This is made possible by the following further method step:

3.1 in the course of fine interpolation, the nominal values to be impressed are derived from profiles averaged over one interpolation interval.

A further advantageous embodiment of the method according to the present invention provides that averaging can be carried out with minimal computational complexity. This is achieved by the following further method steps:

4.1 the integrals required for averaging of the derivatives from the motion are transferred directly from the reference model, 4.2 the averaging of the motion is likewise carried out explicitly in that the individual contributions of all of the polynomials to the total integral of the motion are each added up and the difference between the sums is formed over one interpolation interval.

Furthermore, a control structure is proposed which is particularly suitable for achieving the object of the present invention since it allows effective implementation with little complexity. This control structure has the following elements:

5.1 an at least 4th-order reference model for motion control is provided for reference-variable generation of parameters for impressing nominal motion states, in which reference model, for each axis control loop, 5.2 a nominal position value path is provided for impressing axial nominal position angles in time with the interpolation, 5.3 an advance rotation speed control path is provided for impressing axial nominal rotation speed values in time with the interpolation, and 5.4 a feed-forward torque control path is provided for impressing axial nominal drive torque values in time with the interpolation, in which case 5.5 (e.g., an arrangement) is provided for applying disturbance variables to the feed-forward torque control path in order to compensate for a spring torque which causes oscillations and is associated with the most pronounced natural frequency of the multiple-mass system.

An advantageous embodiment of the control structure of the present invention provides that only the derivative of the jerk has discontinuities in the profile. The following further element is used for this purpose:

6.1 a fine interpolator is provided which interpolates the nominal values to be impressed from input variables averaged over one interpolation interval.

DETAILED DESCRIPTION

For the purposes of the present invention, the term drive system shall refer to a system which includes an actuator, for example an electrical drive, coupling elements and the driven load, for example machine tool or robot axes and additional loads on these axes. The drive system may have means for regulation and/or control.

Methods for feed-forward control of rigid drive systems which are also used in elastic drive systems are based on the assumption that the natural oscillations of the mechanical system are well damped, so that a virtually rigid system is formed which can be described by two integrators connected in series. The interpolator requires nominal axial position and speed values in the axis control loops in time with the interpolation, which are initially still finely interpolated before being processed further. 3rd-order polynomials are used for this purpose:

$$\text{Poly}(t)=a_0+a_1 \cdot t+a^2 \cdot t_2+a_3 \cdot t^3, \ t \in [0,T_{Ipo}] \quad (1)$$

The coefficients $a_v$ can be calculated from the boundary conditions $$\text{Poly}(0)=s_{Start}, \ \text{Poly}(T_{Ipo})=s_{End}, \ \text{Poly}(0)=v_{Start}, \ \dot{\text{Poly}}(T_{Ipo})=v_{End}$$

$S_{start}$ and $S_{End}$ designate the respective location and $V_{Start}$ and $v_{End}$ respectively denote the speed at the start and at the end of the present interpolation interval.

Figure 4:
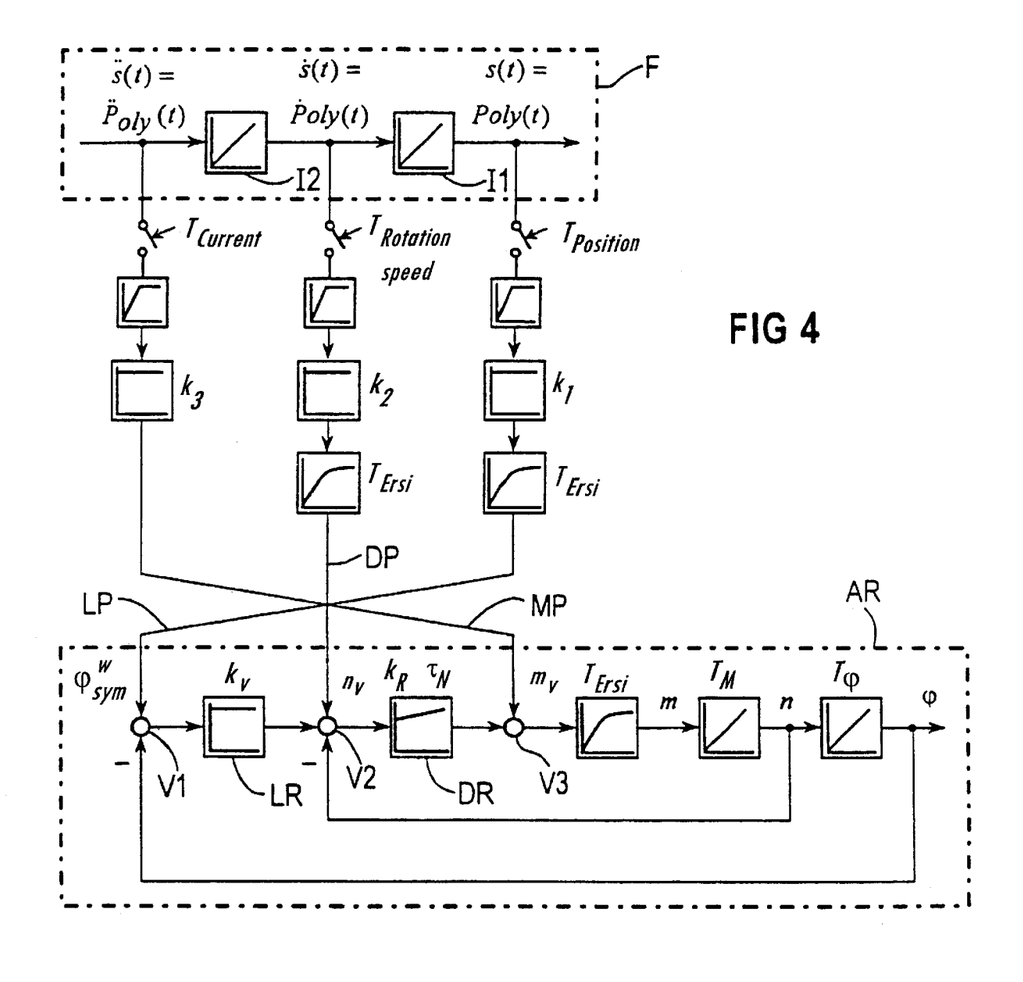
FIG. 4 shows a control structure with an feed-forward control for a rigid drive system.

The time derivatives $$v(t)=\dot{\text{Poly}}(t)=a_1+2a_2 \cdot t+3a_3 \cdot t_2 \quad (2)$$

$$a(t)=\ddot{\text{Poly}}(t)=2a_2+6a_3 \cdot t \quad (3)$$

are used for feed-forward control. In the case of rigid drive systems, this results in a control structure as is shown by way of example in FIG. 4.

FIG. 4 show, a control structure for feed-forward control of rigid drive systems. This control structure includes an axis control loop AR and a reference model F (both surrounded by dashed lines). The axis control loop AR has a position regulator LR to which an axial nominal position angle $\phi^w\text{sym}$ is applied. The position regulator LR is followed in the control path by a rotation speed regulator DR, which may be configured as a PI element. While the nominal position angle $\phi^w\text{sym}$ is applied via a comparator V1, this is done with respect to the nominal rotation speed value $n_v$ via a further comparator V2 which is connected between the output of the position regulator LR and the input of the rotation speed regulator DR and to which a rotation speed value n, which is defined on the output side, is also applied as a control value. The rotation speed regulator DR is followed on the output side by a further comparator V3, to which a nominal acceleration value mv is applied. A position angle $\phi$ is produced on the output side in the axis control loop AR from the values impressed in the control path via an equivalent time constant $T_{Ersi}$ and two integrators $T_m$, $T\phi$, and is fed back to V1. The axial nominal position angle $\phi^w\text{sym}$ is applied via a nominal position value path LP, the nominal rotation speed value nv is applied via a feed-forward rotation speed control path DP, and the nominal acceleration value mv is applied via a feed-forward torque control path MP. The corresponding nominal values are obtained from the reference model F via the feed-forward control paths. This reference model F is supplied on the input side with a nominal acceleration value $\ddot{s}(t)$, from which the nominal acceleration value $m_v$ is obtained via equivalent time constants in time with the current regulator Torrent. A nominal speed value is derived from the predetermined nominal acceleration value in the reference model F via an integrator I2 and provides a feed-forward speed control value in time with the rotation speed regulator $T_{Rotation \ speed}$ taking account of constants $k_2$ and an equivalent time constant $T_{Ersi}$. Finally, a nominal position value is provided in the reference model F via a further integrator I1, from which value an axial nominal position angle $\phi^w\text{sym}$ is generated, in time with the position regulator $T_{position}$ via the elements described above for the feed-forward rotation speed control path DP.

The following evaluations are required for implementation:

Equation 3 in time with the current regulator
Equation 2 in time with the rotation speed regulator
Equation 1 in time with the position regulator In addition to the above-described equations, the nominal position angle path LP and the feed-forward speed and/or rotation speed control path DP contain the symmetry elements of the equivalent time constants $T_{Ersi}$.

Equations (2) and (3) can also be implemented only in time with the position regulator $T_{position}$. A ramp-function generator which is implemented in the feed-forward rotation speed control path for timing matching can then be applied additively.

Figure 5:
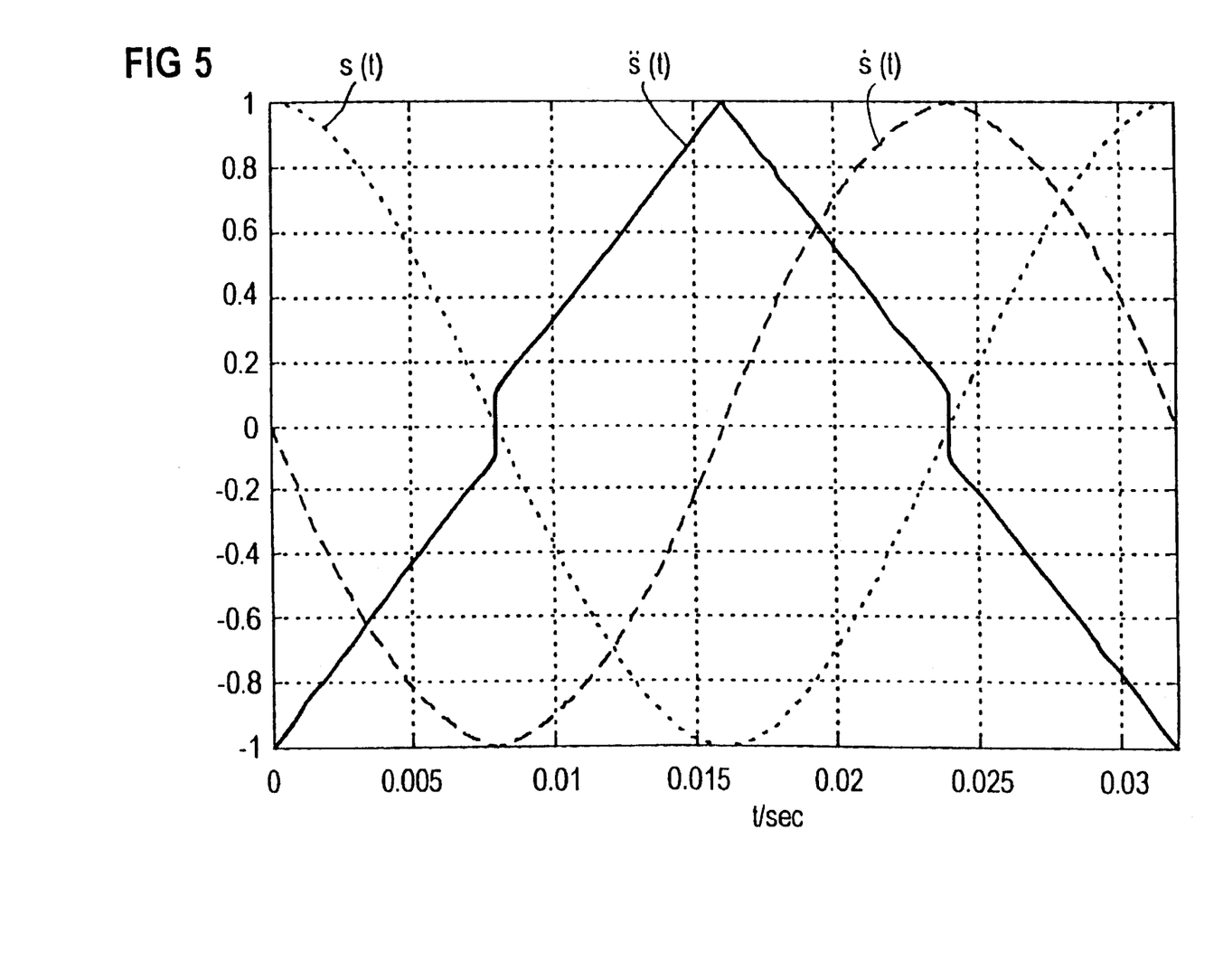
FIG. 5 shows normalized Cartesian motion states of x-axis while moving over a circular path.

When 3rd-degree polynomials are used, it is impossible to prevent the following problem in extreme cases:

Although the profile of the acceleration is continuous within each interpolation interval, it can, however, jump at the interval boundaries if high centrifugal forces occur (even in the case of jerk-limited motion control and $C^2$-continuous path presetting). FIG. 5 shows, as an example, a circular path, which is followed at a constant speed.

The illustration of FIG. 5 shows the normalized cartesian motion states of the x-axis when fine interpolation is carried out using the 3rd-order polynomial. On the basis of the dotted profile, the position is s(t), on the basis of the dashed profile the speed is $\dot{s}(t)$, and the acceleration profile $\ddot{s}(t)$ is illustrated by a solid line. The acceleration profile clearly shows the discontinuities at the interval boundaries.

The mechanism is in this case subjected to severe torque shocks, so that the described feed-forward acceleration control is unusable.

There are two possible alternatives to overcome this: 1. Use 5th-order polynomials instead of 3rd-order. This results in two additional degrees of freedom, as a result of which the acceleration can also be predetermined explicitly in the interpolation grid. 2. Retain 3rd-order polynomials, additionally using averaging of all the states over one interpolation cycle. The averaging will be discussed in more detail below.

As an advantage over the 1st solution, the second solution results in considerably less computational complexity in the kinematic transformation.

The description above is based on the mechanism being sufficiently stiff that it can virtually be regarded as a rigid single-mass system. However, as a rule, an oscillating multiple mass structure is present, having a number of natural frequencies. One of the natural frequencies is often considerably more pronounced than all the others, so that the system can be described with sufficient accuracy as a spring two-mass system. The following descriptions are based on this.

Figure 2:
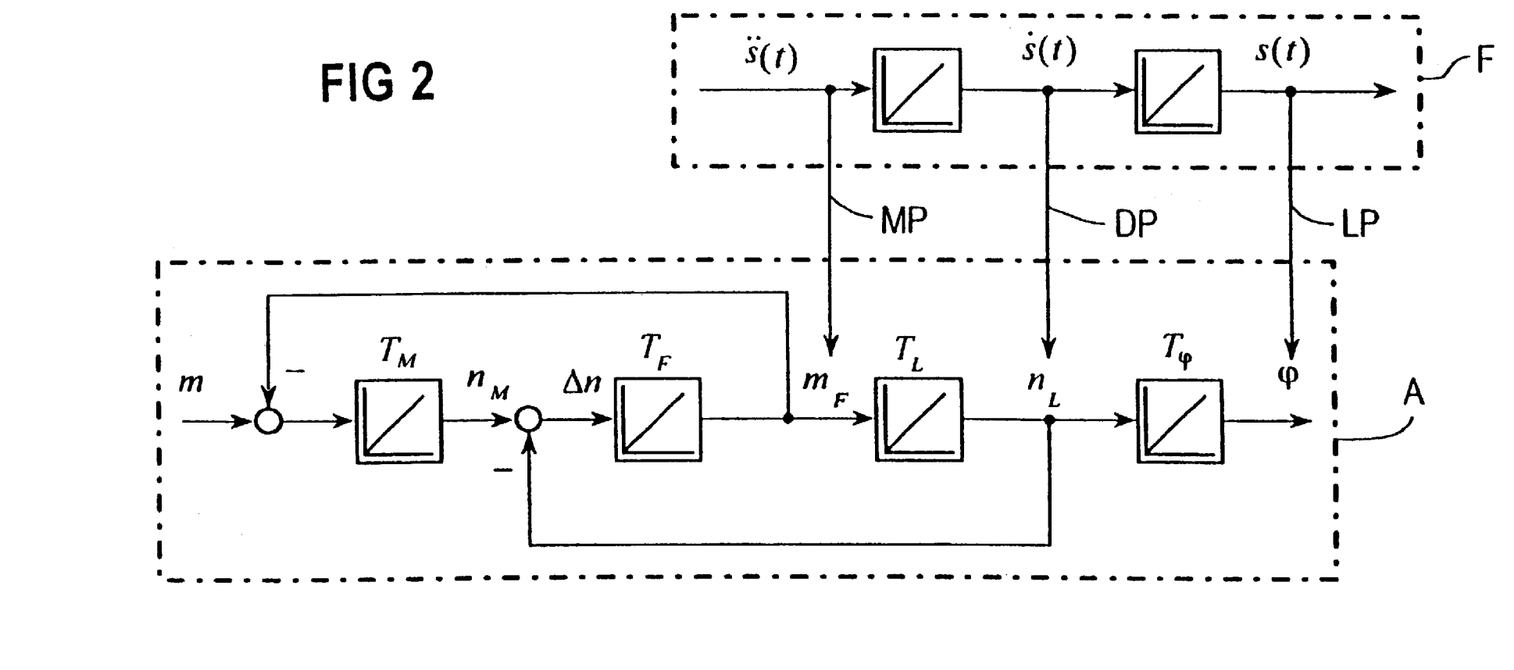
FIG. 2 shows a schematic illustration of a discrepancy between a reference model and an axis mechanism in the elastic system.

As an initial matter, it is necessary to remember that, in this case, there is a discrepancy between the two-store model of motion control and the mechanism which actually exists. This situation is shown in FIG. 2.

The axis mechanism A, which is based on an elastic two-mass system, is in this case illustrated on the basis of a control path surrounded by dashed lines. A torque value m is fed in on the input side, and a position angle $\phi$ is present on the output side. On the basis of the spring two-mass system, the rotation speed nL on the load side is fed back to a rotation speed $n_M$ on the drive side. A spring torque $m_F$ is likewise negatively fed back to the input of the axis mechanism A, that is to say the torque value M. The reference model F represents the two-store model with two integrators which has already been described with reference to the illustration according to FIG. 4. Nominal values are generated via this reference model F, via the nominal position value path LP, the feed-forward rotation speed control path DP and the feed-forward torque control path MP although, owing to the feedback paths in the axis mechanism A, these cannot be directly impressed into the axis control loop as in the control structure according to FIG. 4.

The predetermined acceleration, for example of a machine table of a machine tool, can now no longer be formed directly, but only after a delay, in the form of the spring torque $m_F$. In order to avoid overloading the drives, this situation is suitably "corrected" according to the present invention in the fine interpolator.

On the basis of the four existing stores $T_M$, $T_F$, $T_L$, $T_\varphi$, of the axis mechanism A, it can, initially, be seen that, in contrast to the situation with a rigid system, no direct access is possible here to the second position derivative, but only to the fourth position derivative ($T_{Ersi}$ is set to be approximately equal to zero). The calculation gives:

$$\ddot{\varphi} = \underbrace{\frac{1}{T_M T_L T_F T_\varphi}}_{c_1} \cdot m - \underbrace{\frac{\omega_0^2}{T_L T_\varphi}}_{c_2} \cdot m_F; \quad (4)$$

$$\omega_0 = \sqrt{\frac{T_M + T_L}{T_M T_L T_F}}.$$

This can be used to calculate the drive torque which is required in order to impress a specific value of $\ddot{\varphi}$:

$$\ddot{\varphi} = c_1 \cdot m - c_2 \cdot m_F \stackrel{!}{=} \ddot{\varphi}^w \Rightarrow m \stackrel{!}{=} (\ddot{\varphi}^w + c_2 \cdot m_F) \cdot c_1^{-1} \quad (5)$$

Using this control variable, the overall system behaves like a quadruple integrator chain which—because the elasticities are apparently no longer present—can be appropriately controlled in feed-forward via a fourth-order reference model F. This relationship is shown as a schematic illustration of the torque required to impress the motion states in the case of elastic systems show in FIG. 3.

Figure 3:
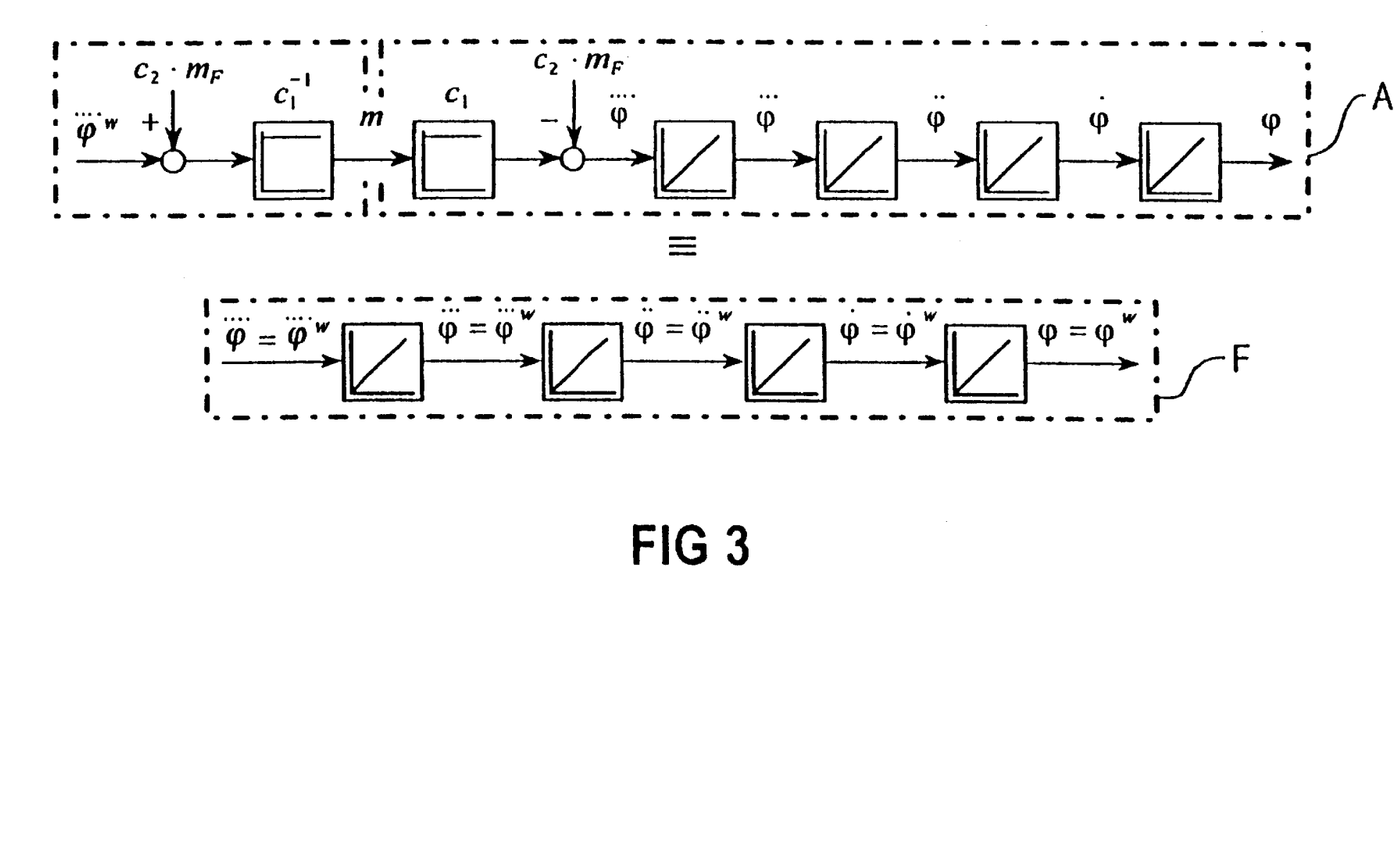
FIG. 3 shows a schematic illustration of a torque required to impress motion states in the elastic system.

The schematic illustration of the axis mechanism A (surrounded by dashed lines) has applied to its input side a nominal value m obtained in accordance with equation (5). The situation shown in equation (5) is for this purpose likewise shown in a schematic element which is surrounded by dashed lines and which, in contrast, shows the relationship of the equation. This sum arrangement is identical to the reference model F illustrated underneath, as is symbolized in the illustration by three horizontal dashes (the identity character).

The spring torque required in accordance with equation (5) for feed-forward control does not need to be measured but, in the same way as the other states required for feed-forward control and for symmetry, can be obtained from the reference model F since, in the undisturbed case, the path behaves identically to the model. This offers the advantage that the feed-forward control remains completely separate from the closed control loop and the disturbance response thus cannot be adversely affected by, for example, inaccuracies in the model parameters. This thus results in the equations (6), which can be derived directly from FIG. 3. In order to indicate that these are variables taken from the reference model F, they are also denoted by "^" in the corresponding illustrations in the FIG:

$$\hat{m} = T_\varphi \cdot T_L \cdot \ddot{\varphi}^w \quad (6)$$

$$\left.\begin{array}{l}\hat{n}_L = T_\varphi \cdot \dot{\varphi}^w \\ \Delta \hat{n} = T_\varphi \cdot T_L \cdot T_F \cdot \dddot{\varphi}^w\end{array}\right\} \Rightarrow \hat{n}_M = \hat{n}_L + \Delta \hat{n} = T_\varphi \cdot \dot{\varphi}^w + T_\varphi \cdot T_L \cdot T_F \cdot \dddot{\varphi}^w$$

Knowledge of these equations allows the control structure for feed-forward control for elastic multiple-mass systems to be stated completely. One possible embodiment is shown in FIG. 1.

Figure 1:
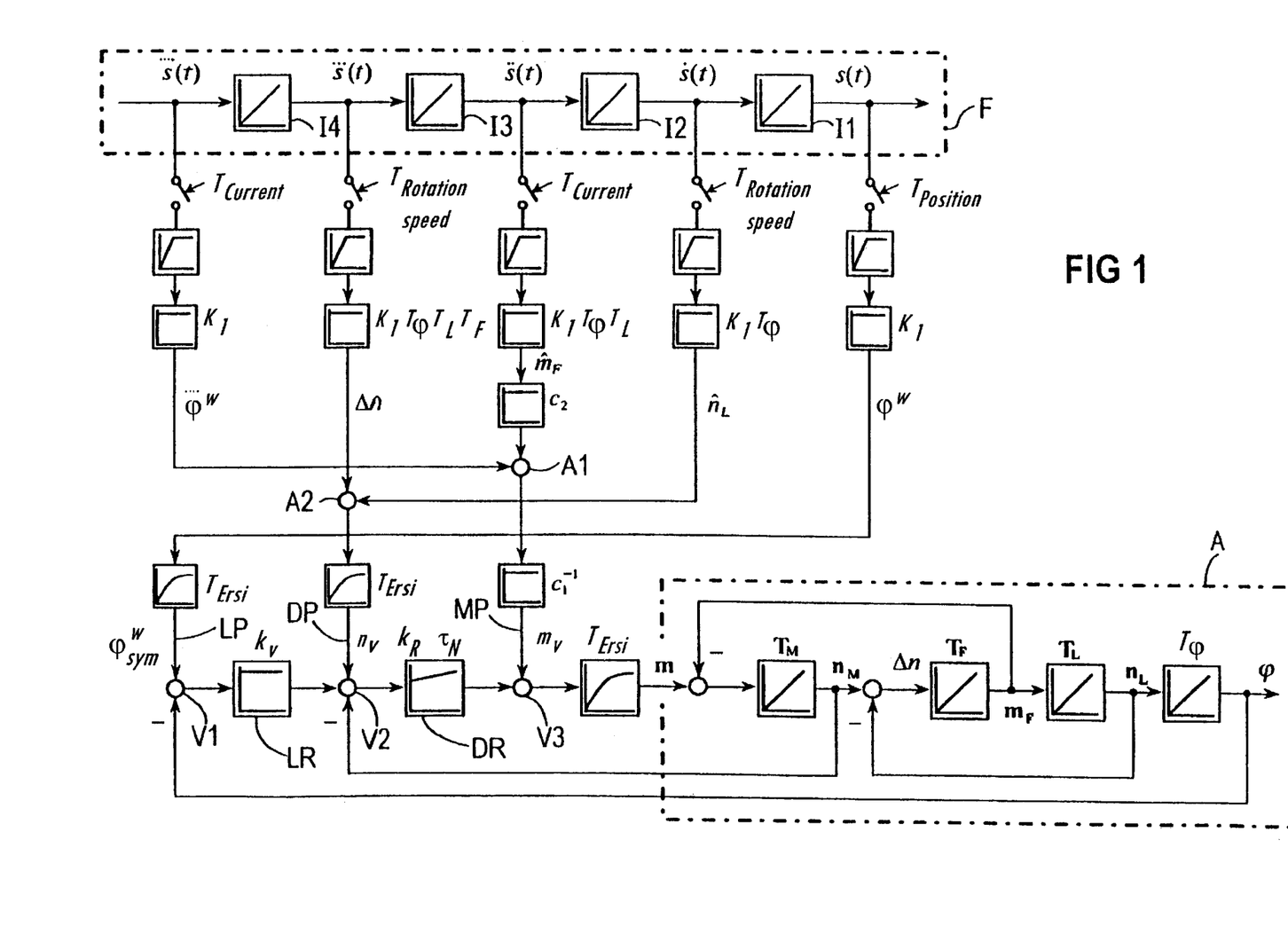
FIG. 1 shows a control structure with an feed-forward control for elastic drive systems.

FIG. 1 shows a control structure according to the present invention with feed-forward control for elastic drive systems. This also includes the axis mechanism A of the elastic drive system, which has been explained above in conjunction with FIG. 2. A reference model F derived in a corresponding manner shown in FIG. 3 for generating variables for motion control is shown, which comprises a chain of four successive integrators I1 to I4, to the input side of which a derivative of the jerk $\dddot{s}(t)$ is applied and which provides a position value s(t) at the output of the last integrator I1. The axis mechanism A now has connected upstream of it a control path for the drive system, whose main components are a position regulator LR, a rotation speed regulator DR which follows it and may be configured as a PI element, and followed by an equivalent time constant $T_{Ersi}$. The position angle $\phi$ which is present on the output side of the axis mechanism A is negatively fed back as a control variable, via a comparator V1, to the input of the position regulator LR. The motor rotation speed $n_M$ is negatively fed back as a control variable to a further comparator V2 which is located between the output of the position regulator LR and the input of the rotation speed regulator DR. A third comparator V3 is arranged between the output of the rotation speed regulator DR and the input of the equivalent time constants $T_{Ersi}$.

An axial nominal position angle $\phi^w$sym is added on the input side via a nominal position value path LP to the position regulator LR, via the comparator V1. A nominal rotation speed value $n_v$ is added to the output signal from the position regulator LR via a feed-forward rotation speed control path DP, via the comparator V2. A nominal drive torque value mv which is provided via a feed-forward torque control path MP is added via the third comparator V3 to the output signal from the rotation speed regulator DR. The nominal variables provided via the corresponding feed-forward control paths LP, DP and MP are derived from the reference model F. The axial nominal position angle $\phi^w$sym is derived from the position value s(t), which is present at the output of the reference model F, in time with the position regulator $T_{position}$ and taking account of corresponding constants such as $k_1$, which corresponds to the reciprocal of the spindle pitch, and other equivalent time constants $T_{Ersi}$.

In order to obtain the nominal rotation speed value $n_v$, a rotation speed reference variable $\check{n}_L$ is obtained in time with the rotation speed $T_{Rotation}$ speed from the speed value $\dot{s}(t)$ provided in the reference model F, and a rotation speed difference $\Delta \check{n}$, obtained from the jerk $\dot{\mathbf{s}}\ \dot{}\ (t)$ in the reference model F, is added to it via an adder A2. The sum value passes via a further equivalent time constant $T_{Ersi}$ as an axial nominal rotation speed value $n_v$, to the comparator V2, where it is applied to the rotation speed regulator DR.

An axial nominal drive torque value $m_v$ is obtained in a similar manner from the reference model F in time with the current regulator $T_{current}$. The variable $\dot{\mathbf{s}}\ \dot{}\ v$ is derived by weighting via the already indicated parameter $k_1$ from the derivative of the jerk $\dot{\mathbf{s}}\ \dot{}\ (t)$, which parameter $k_1$, to which is added, via a further adder A1, the spring torque $\hat{m}_F$ determined from the acceleration value $\ddot{s}(t)$ in the reference model F. The axial nominal drive torque value $m_v$ is formed from the sum, weighted via the factor $C_1^{-1}$, and is added, via the comparator V3 to the output of the rotation speed regulator DR. The required torque m, which is explained in conjunction with FIG. 3 is impressed into the axis mechanism A via the equivalent time constant $T_{Ersi}$ which as described above, follows the comparator V3.

It can be seen from the control structure in FIG. 1 that the motion control now has to operate with the derivative of the jerk as an input variable in order to "match" it to the path (once again assuming $T_{Ersi} \approx 0$). Furthermore, the path has to be $C^3$-continuous in order to ensure that the profile of the jerk can have no jumps. However, for complexity reasons, the two requirements cannot be achieved economically, for which reason the following approach is taken.

It is presupposed that the motion control is fed back, but the path is $C^2$-continuous and the axial motion, speed and acceleration nominal values are transferred to the axis control loops in time with the interpolation. These control loops now use 5th-order polynomials for fine interpolation:

$$s(t) = \text{Poly}(t) = a_0 + a_1 \cdot t + a_2 \cdot t^2 + a_3 \cdot t^3 + a_4 \cdot t^4 + a_5 \cdot t^5 \quad (7)$$

$$\dot{s}(t) = \dot{\text{Poly}}(t) = a_1 + 2a_2 \cdot t + 3a_3 \cdot t^2 + 4a_4 \cdot t^3 + 5a_5 \cdot t^4 \quad (8)$$

$$\ddot{s}(t) = \ddot{\text{Poly}}(t) = 2a_2 6a_3 \cdot t + 12a_4 \cdot t^2 + 20a_5 \cdot t^3 \quad (9)$$

$$\dot{\mathbf{s}}\ \dot{}\ (t) = \dot{\mathbf{P}}\ \dot{}\ oly(t) = 6a_3 + 24a_4 \cdot t 60a_5 \cdot t^2 \quad (10)$$

$$\ddot{\mathbf{s}}\ \dot{}\ (t) = \ddot{\mathbf{P}}\ \dot{}\ oly(t) = 24a_4 + 120a_5 \cdot t \quad (11)$$

Since the profile of $\ddot{\mathbf{p}}\ \dot{}$ will always have jumps, profiles averaged over one interpolation interval are used, instead of instantaneous values. These profiles can be calculated explicitly without any additional complexity, since the integrals required for averaging are already available anyway on the basis of equations (7)–(11). Thus, for example:

$$\overline{\ddot{s}}(t) = \int_{t-T_{Ipo}}^{t} \ddot{s}(t)\,dt = \dot{s}(t) - \dot{s}(t - T_{Ipo});$$

The evaluation can be carried out by using equation (10). Correspondingly, it can be said that:

$$\overline{\ddot{s}}(t) = \dot{s}(t) - \dot{s}(t - T_{Ipo}); \quad (12)$$

$$\overline{\ddot{s}}(t) = \dot{s}(t) - \dot{s}(t - T_{Ipo});$$

$$\overline{\dot{s}}(t) = s(t) - s(t - T_{Ipo}).$$

The position $\overline{S}$ can also be averaged explicitly by, first of all, addition over the individual contributions $I_v$ of all the polynomials in the overall integral $I_{tot}$ of the movement:

$$I_{tot} = \Sigma I_v, \text{ where}$$

$$I_v(t) := \int_{v \cdot T_{Ipo}}^{v \cdot T_{Ipo}+t} s(t)\,dt$$

$$= \int_0^t \text{Poly}_v(t)\,dt$$

$$= a_{0v}t + \frac{a_{1v}}{2}t^2 + \frac{a_{2v}}{3}t^3 + \frac{a_{3v}}{4}t^4 + \frac{a_{4v}}{5}t^5 + \frac{a_{5v}}{6}t^6;$$

$$t \in [0, T_{Ipo}]$$

The mean value thus becomes:

$$\overline{s}(t) = I_{tot}(t) - I_{tot}(t - T_{Ipo}) \quad (13).$$

Figure 6:
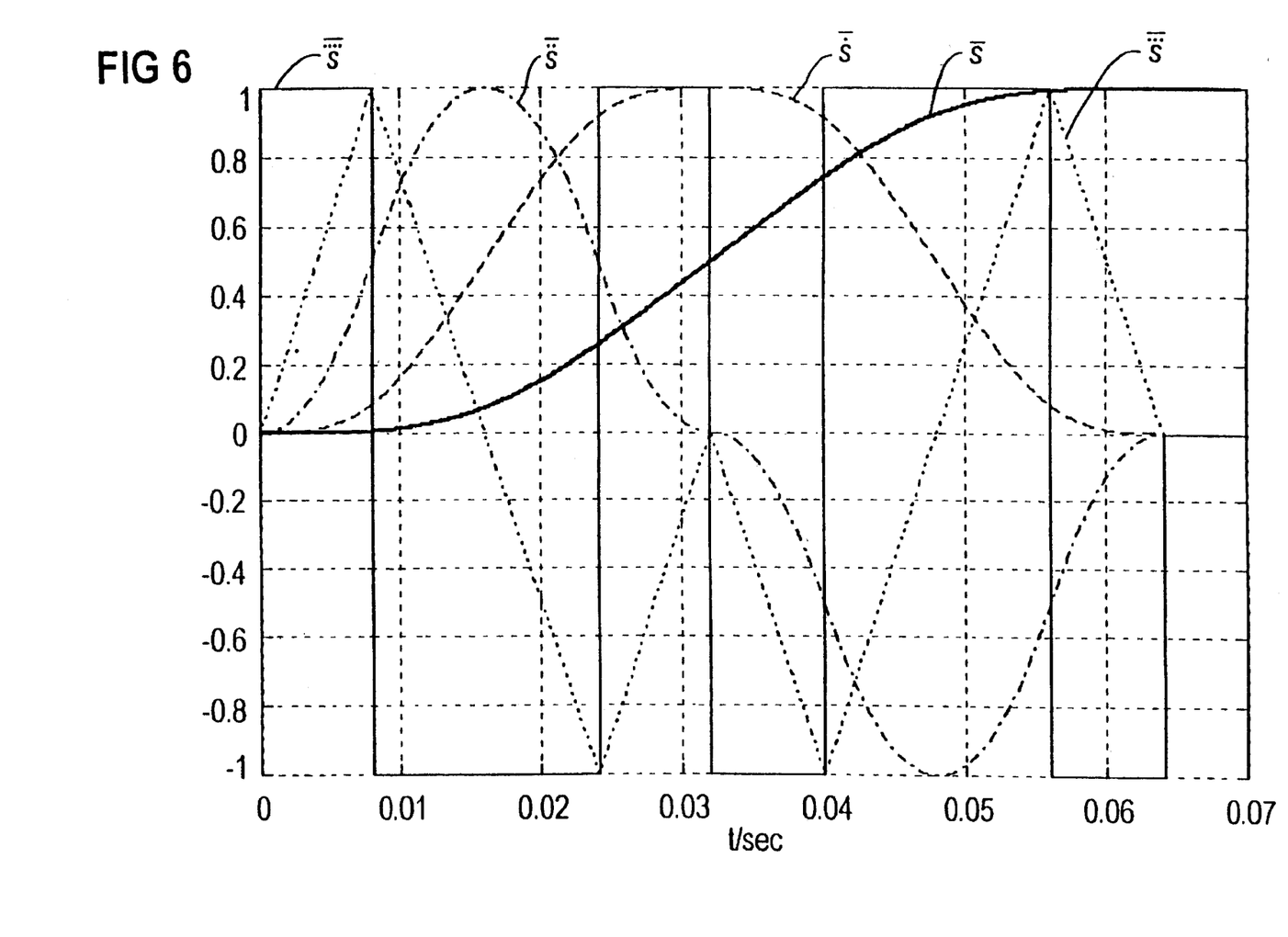
FIG. 6 shows normalized states of a 4th-order reference model during a positioning process.
Figure 7:
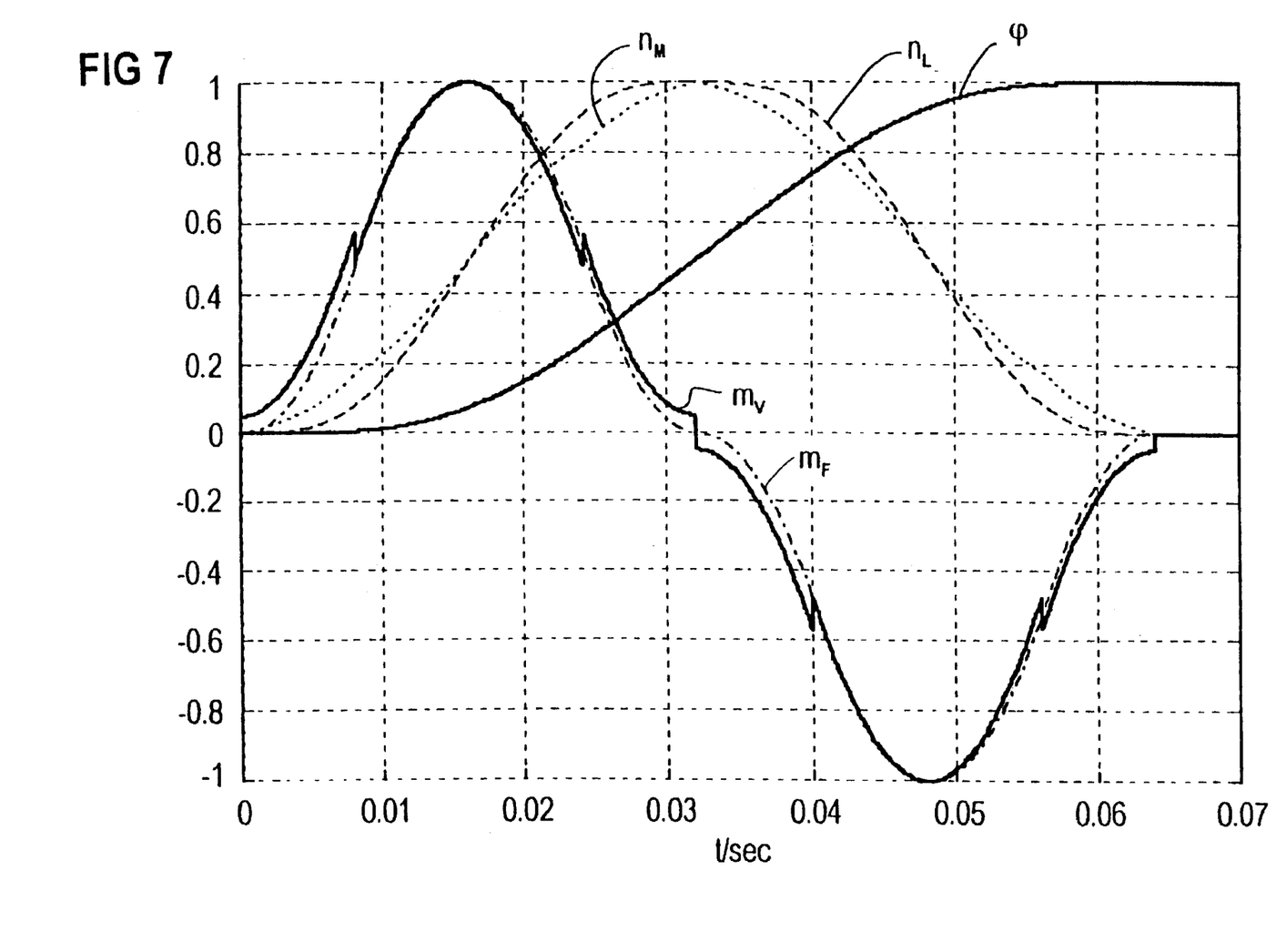
FIG. 7 shows normalized states of the axis mechanism during a positioning process corresponding to FIG. 6.

The illustrations in FIGS. 6 and 7 show the application of the described method to an undamped two-mass system with a natural frequency of 92 Hz. The example is based on the following data:

$T_M=20$ msec, $T_L=60$ msec, $T_F=200\mu$sec, $T_{Ersi}=200\mu$sec, $T_{Ipo}=8$ msec, $T_{position}=1$msec, $T_{Rotation\ speed}=T_{Current}=62.5\ \mu$sec.

First of all, it can be seen from FIG. 6 that is a motion process with feedback since the mean value of the jerk $\dot{\mathbf{s}}\ \dot{}$ varies in the form of a ramp. The mean value of s correspondingly "jumps" in time with the interpolation and, as required, is constant within the interpolation intervals. A comparison of the nominal table position $\overline{s}$ with the actual load angle $\phi$ in FIG. 7 shows—owing to the fact that the equivalent time constant $T_{Ersi}$ is negligibly small—no difference between the two normalized variables. Likewise, the normalized profiles of the nominal table speed $\overline{\dot{s}}$ and the load rotation speed nL as well as the table acceleratio $\ddot{\overline{s}}$ and the torque $m_F$ are virtually identical, as required. The feed-forward control torque $m_v$ varies, as expected, in the same way as the derivative of the jerk only at the transitions between the interpolation intervals.

All the features mentioned in the above description and illustrated in the figures are intended to be regarded as being covered by the invention provided the known prior art allows this, in their own right or in combination.

The above description of the embodiments according to the present invention is provided for the purpose of illustration. These embodiments are not exhausted. The present invention is also not limited to the precise form stated, but numerous modifications and variations are possible in the context of the technical teaching described above. One preferred embodiment has been described in order to illustrate the fundamental details of the present invention and practical applications in order to make it possible for a person skilled in the art to implement the present invention. A multiplicity of other embodiments as well as further modifications are feasible for specific application areas.

What is claimed is:

1. A method for a feed-forward torque control of an elastic and oscillating multiple-mass system, comprising the steps of:

estimating parameters for controlling nominal motion states from an at least 4th-order reference model for controlling a motion of the multiple-mass system;

deriving, from the reference model for each axis control loop of the multiple-mass system, an axial nominal position angle, the axial nominal position angle being impressed via a nominal position value path in an interpolation cycle;

deriving, from the reference model in each axis control loop of the multiple-mass system, an axial nominal rotation speed value, the axial nominal rotation speed value being impressed via an feed-forward rotation speed control path in the interpolation cycle;

deriving, from the reference model in each axis control loop of the multiple-mass system, an axial nominal drive torque value, the axial nominal drive torque value being impressed via an feed-forward torque control path in the interpolation cycle; and deriving from the reference model a spring torque, the spring torque causing oscillations and being associated with a most pronounced natural frequency of the multiple-mass system, the spring torque being compensated for by applying disturbance variables to the feed-forward torque control path.

2. The method according to claim 1, wherein the at least 4th-order reference model includes an at least 5th-order reference model for fine interpolation.

3. The method according to claim 1, further comprising the step of:

deriving the axial nominal position angle, the axial nominal rotation speed value, and the axial nominal drive torque value from derivatives averaged over one interpolation interval.

4. The method according to claim 3, further comprising the steps of:

transferring integrals required for averaging the derivatives directly from the reference model;

summing individual contributions of all polynomials to a total integral of the motion of the multiple-mass system; and forming a difference between the sums over one interpolation interval.

5. The method according to claim 3, wherein the multiple-mass system includes at least one of a numerically controlled machine tool and a robot.

6. A control structure for a feed-forward torque control of an elastic and oscillating multiple-mass system, comprising:

an at least 4th-order reference model for a motion control, the reference model for generating parameters for impressing nominal motion states;

a nominal position path for impressing axial nominal position angles in an interpolation cycle, the nominal position angles being derived as a function of the reference model;

a feed-forward rotation speed control path for impressing axial nominal rotation speed values in the interpolation cycle, the axial nominal rotation speed values being derived as a function of the reference model;

a feed-forward torque control path for impressing axial nominal drive torque values in the interpolation cycle, the axial nominal drive torque values being derived as a function of the reference model; and an arrangement for applying disturbance compensations values to the feed-forward torque control path, the disturbance values compensating for a spring torque which causes oscillations and is associated with a most pronounced natural frequency of the multiple-mass system.

7. The control structure according to claim 6, further comprising:

a fine interpolator interpolating the axial nominal position angles, the axial nominal rotation speed values, and the axial nominal drive torque values from input values averaged over one interpolation interval.

8. The control structure according to claim 6, wherein the multiple-mass system includes at least one of a numerically controlled machine tool and a robot.

* * * * *